United States Patent Office 3,277,047
Patented Oct. 4, 1966

3,277,047
ACYLOXY COMPOUNDS AND USE THEREOF
Terry G. Selin, Schenectady, N.Y., assignor to General Electric Company, a corporation of New York
No Drawing. Filed Dec. 20, 1963, Ser. No. 332,249
7 Claims. (Cl. 260—46.5)

This invention relates to certain organosilicon acyloxy compounds and the use thereof. More particularly, this invention relates to certain organoacyloxy organosilicon compounds and to the use of such compounds as crosslinking agents for the curing of organopolysiloxanes to elastomers at room temperature in a short period of time.

Room temperature vulcanizing silicone rubbers are becoming more common in the art and a number of such materials are known. For example, one of the most useful room temperature vulcanizing silicone rubbers is of the type described in French Patent 1,198,749. This room temperature vulcanizing silicone rubber is obtained by adding, under substantially anhydrous conditions, an organotriacyloxysilane, such as methyltriacetoxysilane, to a silanol chain-stopped liquid diorganopolysiloxane, usually in the presence of a filler. Upon exposure of the resultant mixture to atmospheric moisture, the composition cures to the solid elastic state in a short time at room temperature.

While for many applications the room temperature vulcanizing silicone elastomers of the aforementioned French patent are very satisfactory, there are certain circumstances in which these materials are deficient. One of the major deficiencies of the room temperature vulcanizing silicone rubber of the aforementioned French patent and of the other known room temperature vulcanizing silicone rubbers is their lack of strong and consistent adhesion to surfaces to which it would be desirable to adhere the silicone rubber. In such cases, where stress is applied between the silicone rubber and such surface, it is often found that the silicone rubber pulls away from the surface rather than adhering so strongly to the surface that a rupture in the body of the cured silicone rubber occurs.

One further, although minor, disadvantage of the prior art room temperature vulcanizing silicone rubbers described above, is that with a given silanol chain-stopped diorganopolysiloxane and filler system, it is possible to prepare only one type of cured silicone rubber. Regardless of the amount of organotriacetoxysilane catalyst incorporated into the given polymer-filler system, the resulting product has the same combination of tensile strength, hardness and elongation. It would sometimes be desirable to take a single polymer-filler combination and to modify the properties of the cured product obtainable therefrom by variation of the particular curing agent added to the composition. For example, the same polymer-filler combination might result in polymers of different elongations, different hardnesses and different tensile strengths as selected at will by the formulator.

It is an object of the present invention to provide a new class of organosilicon compounds.

Another object of the present invention is to provide a new class of organosilicon compounds useful in the curing of room temperature vulcanizing silicone elastomers.

It is a still further object of the present invention to provide room temperature curing silicone rubbers of improved adhesion.

These and other objects of my invention will be better understood by reference to the following detailed description of my invention.

This invention is based on my discovery of the class of organoacyloxydisilanes having the formula:

(1)              $(R)_n(Si)_2(OAc)_{6-n}$ where R is a member selected from the class consisting of aryl radicals and lower alkyl radicals, Ac is a saturated aliphatic monoacyl radical and $n$ has a value of from 1 to 3, inclusive. Compositions within the scope of Formula 1 can be added in appropriate amounts to a silanol chain-stopped liquid diorganopolysiloxane, either in the presence or absence of fillers, under substantially anhydrous conditions. As long as the resulting mixture is maintained under anhydrous conditions, the consistency of the product remains unchanged. However, upon exposure of the composition to moisture, either atmospheric or otherwise, the compositions are converted to the solid, cured elastic silicone rubber state rapidly and at room temperature.

The organoacyloxydisilanes of Formula 1 include disilanes in which the R group is either an aryl radical or a lower alkyl radical, e.g., phenyl, tolyl, xylyl, etc., or an alkyl radical containing from 1 to 7 carbon atoms. Preferably, the group represented by R in Formula 1 is a methyl radical. The saturated aliphatic monoacyl radical represented by Ac can be any of such radicals such as, for example, acetyl, propionyl, butyryl, hexoyl, 2-ethylhexoyl, octanoyl, isovaleryl, stearyl, etc., radicals. Preferably, the radical represented by Ac is a lower acyl radical having from 1 to 4 carbon atoms and even more particularly, it is preferred that the radical represented by Ac be the acetyl radical.

The organoacyloxydisilanes of Formula 1 include a wide variety of materials in which each of the two silicon atoms can contain both silicon-bonded organic radicals and silicon-bonded acyloxy radicals. Alternatively, one of the silicon atoms can be free of one of such radicals. For example, as an illustration of those compositions within the scope of the present invention where R is methyl and Ac is acyloxy, there can be named 1,1,2-trimethyltriacetoxydisilane, 1,1,1-trimethyltriacetoxydisilane, 1,1-dimethyltetraacetoxydisilane, 1,2-dimethyltetraacetoxydisilane and methylpentaacetoxydisilane.

The organoacyloxydisilanes of Formula 1 can be prepared by reacting an organochlorodisilane having the formula:

(2)              $(R)_n(Si)_2(Cl)_{6-n}$ where R and $n$ are as previously defined, with either the acid anhydride corresponding to the desired acyl radical or with the sodium salt of the acid corresponding to such acyl radical. For example, 1,2-dimethyltetraacetoxydisilane can be prepared by reacting 1,2-dimethyltetrachlorodisilane with either acetic anhydride or sodium acetate.

The organochlorodisilanes of Formula 2, where R is an alkyl radical, are known in the art and are generally available as the residue of the reaction between an organic chloride and heated silicon in the presence of a suitable catalyst such as copper. For example, the various methylchlorodisilanes employed as starting materials in the preparation of the compounds of the present invention result from the reaction between methyl chloride and silicon. A number of such organochlorodisilanes are described in Patent 2,598,434—Mohler et al., and a number of other of such compounds are shown by Kumada et al., J. Org. Chem. 21, 1264 (1956).

Organochlorodisilanes within the scope of Formula 2, where R is an aryl radical, can be prepared by the reaction of hexachlorodisilane with an aryl Grignard reagent. For example, phenylpentachlorodisilane is prepared by refluxing equimolar amounts of hexachlorodisilane and phenyl magnesium bromide in diethyl ether. Similarly, dinaphthyltetrachlorodisilane is prepared by reacting one mole of hexachlorodisilane with two moles of naphthyl magnesium bromide in diethyl ether at the reflux temperature of the diethyl ether.

The silanol chain-stopped liquid diorganopolysiloxanes which can be employed in the practice of the present invention have the formula:

(3) $\quad$ HO[R'$_2$SiO]$_x$H where R' is any monovalent hydrocarbon radical, halogenated monovalent hydrocarbon radical or cyanoalkyl radical and $x$ has a value of from about 10 to 10,000 or more.

Among the radicals represented by R' in Formula 3 can be mentioned, for example, alkyl radicals, e.g., methyl, ethyl, butyl, octyl, octadecyl, etc. radicals; alkenyl radicals, e.g., vinyl, allyl, etc. radicals; cycloaliphatic radicals, e.g., cyclohexyl, cycloheptyl, cyclohexenyl, etc. radicals; aryl radicals, e.g., phenyl, tolyl, xylyl, naphthyl, etc. radicals; aralkyl radicals, e.g., benzyl, phenylethyl, etc. radicals; halogenated monovalent hydrocarbon radicals, e.g., chloromethyl, pentafluorobutyl, trifluoropropyl, dibromophenyl, chlorophenyl, trifluoromethylphenyl, chlorocyclohexyl, etc. radicals and cyanoalkyl radicals, preferably cyanoalkyl radicals in which the nitrile radical is attached to silicon through at least 2 carbon atoms, e.g., beta-cyanoethyl, beta-cyanopropyl, gamma-cyanopropyl, delta-cyanobutyl, etc. radicals. Preferably, the silanol chain-stopped diorganopolysiloxane fluids are those in which the majority of the radicals are methyl radicals.

It should be understood that within the scope of the silanol chain-stopped diorganopolysiloxanes are also included copolymers containing more than one type of diorganosiloxane unit. For example, included within such materials are copolymers of dimethylsiloxane units and methylphenylsiloxane units as well as copolymers of dimethylsiloxane units, diphenylsiloxane units and methylvinylsiloxane units. While the polymeric materials of the present invention have been described as diorganopolysiloxanes, it should be understood that such materials can contain minor amounts, e.g., up to about 1%, of monoorganosiloxane units or triorganosiloxane units.

The silanol chain-stopped liquid diorganopolysiloxanes employed in the practice of the present invention vary from thin liquids up to viscous gums, depending upon the value of $x$ in Formula 3 and the nature of the particular organic groups attached to the silicon atom. Preferably, however, the silanol chain-stopped diorganopolysiloxane is selected to have a viscosity in the range of from about 50 centipoise to 50,000 centipoise when measured at 25° C.

The room temperature curing silicone rubber compositions of the present invention can be prepared by simply mixing the organoacyloxydisilane of Formula 1 with the silanol chain-stopped diorganopolysiloxane of Formula 3. Since the organoacyloxydisilane of Formula 1 will tend to hydrolyze upon contact with moist air, care should be exercised during the addition of the organoacyloxydisilane to the silanol chain-stopped diorganopolysiloxane. Likewise, care should be taken that the mixture of the organoacyloxydisilane and the silanol chain-stopped diorganopolysiloxane is maintained in a substantially anhydrous condition if it is desired to store the mixture for an extended period of time prior to conversion to the silicone rubber state. On the other hand, if it is desired to permit the mixture to cure immediately upon addition of the organoacyloxydisilane to the fluid, no special precautions need be taken and the two materials are merely mixed and placed in the form or shape in which it is desired for the material to be cured.

The amount of the organoacyloxydisilane added to the silanol chain-stopped diorganopolysiloxane can vary within wide limits. However, for best results, it is preferred to add at least 1.1 mole, e.g., from 1.5 to 5.0 moles, of the organoacyloxydisilane per mole of silicon-bonded hydroxyl groups in the diorganopolysiloxane. Satisfactory curing can be obtained, however, when amounts of the organoacyloxydisilane employed is as low as 1 mole per mole of silanol groups in the silanol chain-stopped diorganopolysiloxane. The temperature of the addition of the organoacyloxydisilane to the silanol chain-stopped diorganopolysiloxane is immaterial, with the addition generally being effected at a temperature of from about 20 to 80° C.

The composition prepared by mixing the organoacyloxydisilane with the silanol chain-stopped diorganopolysiloxane can be used without further modification in many sealing, caulking or coating applications by merely placing the composition in the desired place and permitting it to cure upon exposure to the moisture present in the atmosphere. Upon exposure of such compositions to atmospheric moisture, even after storage for times as long as two years, a hard "skin" will form on the composition after 20 to 30 minutes and complete cure will have been effected within 24 hours, all at room temperature.

It is often desirable to modify the compositions of the present invention by incorporating various fillers or extenders to change various properties, such as color and cost. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clays, asbestos, carbon and graphite, as well as organic materials such as cork, cotton and synthetic fibers. Where fillers are added to the compositions of the present invention, they are generally employed in amounts of from about 20 to 200 parts filler per 100 parts of the silanol chain-stopped diorganopolysiloxane. In any event, where fillers are employed in such compositions, the fillers can be added at any stage in the preparation of such composition. Specifically, the fillers, the silanol chain-stopped diorganopolysiloxane and the organoacyloxydisilane can be added in any order, with adequate protection maintained to keep the entire reaction mixture substantially anhydrous if it is desired to store the resulting material for an extended period of time prior to use. The presence of the fillers in the compositions of the present invention has no significant effect on the curing characteristics of such compositions, with initial skinning occurring within about one-half hour at room temperature and complete cure being obtained within about 24 hours at room temperature.

One of the particular advantages of the use of the organoacyloxydisilanes of the present invention in the preparation of the room temperature curing silicone rubbers of the present invention is the fact that by the selection of a particular organoacyloxydisilane, the properties of the resulting product can be modified for any given combination of a particular silanol chain-stopped diorganopolysiloxane and filler. In particular, the "tightness" of the cure of the room temperature vulcanizing silicon rubber can be controlled by selection of an organodiacyloxydisilane of controlled functionality. By functionality is meant the number of silicon-bonded acyloxy groups in the organoacyloxydisilane. It has been found that as the functionality of the organoacyloxydisilane in the room temperature curing silicone rubber increases, the tightness of cure increases. The outward effect of tightness of cure is a decrease in the percent elongation of the cured silicone rubber and an increase in tensile strength and hardness. Thus, for a given combination of a particular silanol chain-stopped diorganopolysiloxane and filler, the physical properties of the final cured elastomer can be controlled by modifying the particular organoacyloxydisilane employed.

The room temperature curing silicone rubber compositions of the present invention are particularly adapted for caulking and sealing applications where adhesion to various surfaces is important. For example, the materials are useful in household caulking applications and in industrial applications such as on buildings, factories, automotive equipment, and where adhesion to masonry, glass, metal, wood, or plastic is required.

The following examples are illustrative of the practice of my invention and are not intended for purposes of limitation. All parts are by weight.

Example 1

Into a reaction vessel was added 465 parts of 1,2-dimethyltetrachlorodisilane and 75 parts acetic anhydride. The reaction mixture was heated to 90° C. and acetyl chloride began to distill off. An additional portion of 1150 parts of acetic anhydride was then added dropwise over a two hour period while the pot temperature remained at 90° to 110° C. with continuous removal of acetyl chloride. The solution was then maintained at 110° C. until no further acetyl chloride was removed and material boiling below 100° C. at 30 millimeters was removed by distillation. The residue was then fractionally distilled to yield a fraction boiling at 110 to 115° C. at 0.3 millimeter, which was recrystallized from hexane to yield 1,2-dimethyltetraacetoxydisilane. This compound gave an acetoxy group analysis of 72.0 as compared with the theoretical value of 73.0.

Example 2

To 100 parts of a silanol chain-stopped dimethylpolysiloxane having a viscosity of 3,000 centipoise at 25° C. was added 5 parts of the 1,2-dimethyltetraacetoxydisilane prepared in Example 1 under substantially anhydrous conditions. A first portion of this material was spread on a stainless steel plate and allowed to stand for 24 hours at room temperature. By the end of this time, the material had been converted to a solid silicone rubber having a Shore A hardness of 32. Another portion of this mixture was cast on a tin plated sheet and allowed to cure for 24 hours and was removed from the sheet by amalgamation of the tin surface with mercury. This material showed a tensile strength of 250 p.s.i., an elongation of 280% and a Shore A hardness of 32. A third portion of this material was cast onto a tin plated sheet after storage for three months and exhibited physical properties substantially the same as the materials which were cured immediately after preparation. As a control, 5 parts by weight of methyltriacetoxysilane was added under substantially anhydrous conditions to 100 parts of the silanol chain-stopped dimethylpolysiloxane mentioned above, and was cast on the surface of a stainless steel sheet. After 24 hours, this material had cured to a rubbery state but could be stripped cleanly from the stainless steel plate. In contract to this, the cured silicone rubber of the present invention containing the 1,2-dimethyltetraacetoxydisilane could not be stripped from the steel plate without rupturing the silicone rubber.

Example 3

To a reaction vessel was charged 134 parts of 1,1,2-trimethyltrichlorodisilane and 50 parts acetic anhydride. This reaction mixture was then heated to a temperature of 90° C., at which temperature acetyl chloride began distilling off. At this point, there were slowly added to the reaction mixture over a period of 1.5 hours, 240 parts of additional acetic anhydride while the reaction mixture was maintained at a temperature of from 90 to 110° C. Subsequent to this addition, the reaction mixture was maintained at 110° C. for an additional one hour, during which time distillation of acetyl chloride ceased. Materials boiling below 100° C. at 30 millimeters were then stripped from the reaction mixture and the residue was fractionally distilled to produce a liquid fraction boiling at a temperature of from 68 to 72° C. at 0.6 millimeter. This fraction was found to contain 64.4% acetoxy groups as compared with the theoretical values of 63.7% for 1,1,2-trimethyltriacetoxydisilane.

Example 4

To 100 parts of the silanol chain-stopped dimethylpolysiloxane having a viscosity of 20,000 centipoise at 25° C. was added 5 parts of the 1,1,2-trimethyltriacetoxydisilane prepared in Example 3 under anhydrous conditions. A sample of this material was poured onto a tin plated stainless steel sheet and allowed to stand for 24 hours at 25° C. At the end of this time, the sheet was removed from the steel base by amalgamation of the tin layer and the resulting material was found to have a tensile strength of 200 p.s.i., an elongation of 455% and a hardness (Shore A) of 20. It should be noted that the tensile strength of the material of this Example 4 was lower than that of the silicone rubber of Example 2, and the elongation of this material was higher than that of Example 2 as would be expected since the methylacetoxydisilane of this example had a lower functionality than the 1,2-dimethyltetraacetoxydisilane used in Example 2.

Example 5

Ethylpentapropionoxydisilane is prepared by reacting ethylpentachlorodisilane with sodium propionate. The ethylpentachlorodisilane is obtained as a residue of the reaction between ethyl chloride and silicon. To 100 parts of a copolymer of diphenylsiloxane units and dimethylsiloxane units containing an average of 500 diorganosiloxane units per molecule of which 3% are diphenylsiloxane units and having a viscosity of about 1500 centipoise at 25° C. and containing silanol chain-stopping is added 4 parts of ethylpentapropionoxydisilane. This reaction mixture is spread on a stainless steel plate and allowed to stand at room temperature for 24 hours, during which time it cures to a solid, elastomeric silicone.

Example 6

Phenylpentachlorodisilane is prepared by mixing 120 parts of hexachlorodisilane with 90 parts of phenyl magnesium bromide in 300 parts diethyl ether. The reaction is effected by the dropwise addition of the phenyl magnesium bromide and 150 parts of the ether to the disilane in the remainder of the ether. After the addition is completed, the reaction mixture is refluxed for one hour, the solids are filtered and phenylpentachlorodisilane is recovered by fractional distillation. Following the procedure of Example 1, the phenylpentachlorodisilane is converted to phenylpentaacetoxydisilane. To 100 parts of a silanol chain-stopped dimethylpolysiloxane having a viscosity of 1,000 centipoise at 25° C. is added 30 parts of calcium carbonate and 5 parts of phenylpentaacetoxydisilane. This reaction mixture is spread on a stainless steel plate and allowed to stand at room temperature for 24 hours during which time it cures to a solid, elastomeric silicone which adheres tenaciously to the steel plate.

While the foregoing examples have illustrated a number of embodiments of my invention, it should be understood that my invention is applicable broadly to the class of organoacyloxyldisilanes encompassed by Formula 1 and to room temperature vulcanizing silicone elastomers comprising any of the silanol chain-stopped fluid diorganopolysiloxanes within the scope of Formula 3 and one of the aforementioned organoacyloxydisilanes.

What I claim as new and desire to secure by Letters Patent of the United States is:

1. A composition protected from moisture and curable to the solid, elastic state upon exposure to moisture comprising a liquid silanol chain-stopped diorganopolysiloxane having a viscosity of at least about 50 centipoise at 25° C. and in which the organo groups are members selected from the class consisting of monovalent hydrocarbon radicals, halogenated monovalent hydrocarbon radicals and cyanoalkyl radicals and an organoacyloxydisilane having the formula:

$$(R)_n(Si)_2(OAc)_{6-n}$$

where R is a member selected from the class consisting of aryl radicals and lower alkyl radicals, Ac is an acyl radical and $n$ has a value of from 1 to 3, inclusive.

2. A composition protected from moisture and curable to an organopolysiloxane elastomer upon exposure to moisture comprising a liquid silanol chain-stopped diorganopolysiloxane having the formula:

$$HO[R'_2SiO]_xH$$

and an organoacyloxydisilane having the formula:

$$(R)_n(Si)_2(OAc)_{6-n}$$

where R' is a member selected from the class consisting of monovalent hydrocarbon radicals, halogenated monovalent hydrocarbon radicals and cyanoalkyl radicals, R is a member selected from the class consisting of aryl radicals and lower alkyl radicals, Ac is an acyl radical, $x$ has a value of at least about 10 and $n$ has value of from 1 to 3, inclusive.

3. A composition protected from moisture and curable upon exposure to moisture comprising a liquid silanol chain-stopped dimethylpolysiloxane having a viscosity of at least about 50 centipoise at 25° C. and 1,1,2-trimethyltriacetoxydisilane.

4. A room temperature curable organopolysiloxane protected from moisture and which is convertible to the solid, elastic cured state upon exposure to moisture comprising the product obtained by mixing a liquid silanol chain-stopped diorganopolysiloxane having the viscosity of at least about 50 centipoise at 25° C. and 1,2-dimethyltetraacetoxydisilane, the organo groups of said diorganopolysiloxane being selected from the class consisting of monovalent hydrocarbon radicals, halogenated monovalent hydrocarbon radicals, and cyanoalkyl radicals.

5. An organopolysiloxane composition protected from moisture and curable upon exposure to moisture to an elastomeric material comprising a liquid silanol chain-stopped dimethylpolysiloxane having a viscosity of from about 50 to 50,000 centipoise when measured at 25° C., a filler, and an organoacyloxydisilane having the formula:

$$(R)_n(Si)_2(OAc)_{6-n}$$

where R is a member selected from the class consisting of aryl radicals and lower alkyl radicals, Ac is an acyl radical and $n$ has a value of from 1 to 3, inclusive.

6. The composition of claim 5 in which the organoacyloxydisilane is 1,2-dimethyltetraacetoxydisilane.

7. A composition protected from moisture and curable to the solid, elastic state upon exposure to moisture comprising a liquid silanol chain-stopped diorganopolysiloxane having a viscosity of from about 50 to 50,000 centipoise at 25° C. and in which the organo groups are members selected from the class consisting of monovalent hydrocarbon radicals, halogenated monovalent hydrocarbon radicals, and cyanoalkyl radicals and an organoacyloxydisilane having the formula:

$$(R)_n(Si)_2(OAc)_{6-n}$$

where R is a member selected from the class consisting of aryl radicals and lower alkyl radicals, Ac is an acyl radical, and $n$ has a value of from 1 to 3, inclusive, where said organoacyloxydisilane is present in an amount equal to from 1.5 to 5.0 moles per mole of silicon-bonded hydroxyl groups in said silanol chain-stopped diorganopolysiloxane.

References Cited by the Examiner

UNITED STATES PATENTS

| | | | |
|---|---|---|---|
| 2,598,435 | 5/1952 | Mohler et al. | 260—448.2 |
| 2,709,176 | 5/1955 | Bluestein | 260—448.2 |
| 3,035,016 | 5/1962 | Bruner | 260—46.5 |
| 3,151,099 | 9/1964 | Ceyzeriat et al. | 260—46.5 |
| 3,169,942 | 2/1965 | Pike | 260—46.5 |

FOREIGN PATENTS 1,198,749  6/1959  France.

LEON J. BERCOVITZ, *Primary Examiner.*

DONALD E. CZAJA, *Examiner.*

M. I. MARQUIS, *Assistant Examiner.*